United States Patent
Xu et al.

(10) Patent No.: US 10,743,154 B2
(45) Date of Patent: Aug. 11, 2020

(54) METHOD AND APPARATUS FOR FORWARDING VEHICLE TO EVERYTHING SERVICE

(71) Applicant: ZTE CORPORATION, Shenzhen (CN)

(72) Inventors: Hui Xu, Shenzhen (CN); Zijiang Ma, Shenzhen (CN); Yong Lv, Shenzhen (CN); Chen Lu, Shenzhen (CN); Yaying Wang, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 15/772,984

(22) PCT Filed: Jul. 4, 2016

(86) PCT No.: PCT/CN2016/088442
§ 371 (c)(1),
(2) Date: May 2, 2018

(87) PCT Pub. No.: WO2017/076032
PCT Pub. Date: May 11, 2017

(65) Prior Publication Data
US 2018/0317066 A1    Nov. 1, 2018

(30) Foreign Application Priority Data
Nov. 2, 2015   (CN) .......................... 2015 1 0736321

(51) Int. Cl.
*H04W 4/40* (2018.01)
*H04W 4/46* (2018.01)
(Continued)

(52) U.S. Cl.
CPC .............. *H04W 4/40* (2018.02); *H04W 4/06* (2013.01); *H04W 4/46* (2018.02); *H04W 40/02* (2013.01)

(58) Field of Classification Search
CPC ........... H04W 4/06; H04W 4/40; H04W 4/44; H04W 4/46; H04W 76/14
See application file for complete search history.

(56) References Cited

U.S. PATENT DOCUMENTS 9,578,576 B2 *   2/2017   Berggren .............. H04W 76/14
9,749,966 B2 *   8/2017   Lindoff ............... H04W 52/383
(Continued)

FOREIGN PATENT DOCUMENTS

CN    105430621 A         3/2016
CN    107360609 A   *   11/2017
(Continued)

OTHER PUBLICATIONS

3GPP TSG RAN WG2 #91bis; "Enhancements for eNB type RSU and UE type RSU"; Dated: Oct. 5-9, 2015; 7 pages.
(Continued)

*Primary Examiner* — Eric Nowlin
(74) *Attorney, Agent, or Firm* — McDonald Hopkins LLC

(57) ABSTRACT

Disclosed are a method and apparatus for forwarding a Vehicle to Everything (V2X) service, the method including: receiving, by a base station eNB, information carrying a V2X service identification or an index of a V2X service identification sent by a User Equipment (UE) through a Uu interface; determining a V2X service needing to be forwarded according to the V2X service identification or the index of the V2X service identification, and determining a forwarding mode for forwarding the V2X service, by the eNB; and forwarding, by the eNB, data of the V2X service sent by the UE through the Uu interface according to the forwarding mode.

7 Claims, 6 Drawing Sheets

(51) Int. Cl.
*H04W 4/06* (2009.01)
*H04W 40/02* (2009.01)

(56) References Cited

U.S. PATENT DOCUMENTS

| | | | |
|---|---|---|---|
| 9,959,752 B2* | 5/2018 | Rech | G08G 1/017 |
| 9,979,790 B1* | 5/2018 | Park | H04W 76/10 |
| 10,075,810 B2* | 9/2018 | Patil | H04W 4/046 |
| 10,098,129 B2* | 10/2018 | Lindoff | H04W 52/383 |
| 10,111,190 B2* | 10/2018 | Pelletier | H04W 56/0045 |
| 10,187,766 B2* | 1/2019 | Lee | H04W 4/046 |
| 10,212,102 B2* | 2/2019 | Lee | H04W 4/40 |
| 10,327,252 B2* | 6/2019 | Byun | H04L 5/0053 |
| 10,397,836 B2* | 8/2019 | Park | H04W 36/0022 |
| 10,582,443 B2* | 3/2020 | Atarius | H04L 65/1016 |
| 10,638,285 B2* | 4/2020 | Chun | H04W 80/08 |
| 2013/0157676 A1* | 6/2013 | Baek | H04W 72/0486 455/452.1 |
| 2016/0014663 A1* | 1/2016 | Berggren | H04W 76/14 455/436 |
| 2016/0066356 A1* | 3/2016 | Lindoff | H04W 52/383 370/329 |
| 2016/0081039 A1* | 3/2016 | Lindoff | H04W 52/383 455/450 |
| 2017/0272384 A1* | 9/2017 | Lee | H04W 4/40 |
| 2017/0323562 A1* | 11/2017 | Rech | G08G 1/017 |
| 2017/0330457 A1* | 11/2017 | Bhalla | G08G 1/093 |
| 2018/0109937 A1* | 4/2018 | Lee | H04W 4/046 |
| 2018/0152819 A1* | 5/2018 | Pinheiro | H04W 4/40 |
| 2018/0159935 A1* | 6/2018 | Cavalcanti | H04W 4/44 |
| 2018/0167790 A1* | 6/2018 | Cavalcanti | H04L 67/12 |
| 2018/0184270 A1* | 6/2018 | Chun | H04W 92/10 |
| 2018/0199173 A1* | 7/2018 | Xu | H04W 76/14 |
| 2018/0206089 A1* | 7/2018 | Cavalcanti | H04W 36/0083 |
| 2018/0213376 A1* | 7/2018 | Pinheiro | H04W 76/14 |
| 2018/0242115 A1* | 8/2018 | Kim | H04W 4/06 |
| 2018/0242190 A1* | 8/2018 | Khoryaev | H04W 28/0284 |
| 2018/0317066 A1* | 11/2018 | Xu | H04W 4/06 |
| 2018/0376308 A1* | 12/2018 | Xiao | H04L 45/22 |
| 2019/0037461 A1* | 1/2019 | Li | H04W 36/03 |
| 2019/0059019 A1* | 2/2019 | Wallentin | H04W 28/0268 |
| 2019/0104530 A1* | 4/2019 | Deng | H04W 8/245 |

FOREIGN PATENT DOCUMENTS

| | | | | |
|---|---|---|---|---|
| CN | 107454552 A | * | 12/2017 | G08G 1/017 |
| WO | 2015147615 A1 | | 10/2015 | |
| WO | WO-2016163791 A1 | * | 10/2016 | H04W 4/046 |

OTHER PUBLICATIONS

3GPP TSG-RAN WG2 Meeting #91bis; "Considerations of V2X implications to RAN operation"; Dated: Oct. 5-9, 2015; 7 pages.
Ericsson; 3GPP TSG-RAN WG2 #91bis; "Traffic management and resource allocation in V2X;"; Dated: Oct. 5-9, 2015; 5 pages.
International Search Report; International Application No. 16861302. 4-1213/3373611 PCT/CN2016088442; International Filing Date: Jul. 4, 2016; dated Sep. 11, 2018; 9 pages.
Intel Corporation., "Support of Non-IP Communication for V2X Use Cases", 3GPP TSG-SA WG1 Meeting #70 S1-151021, Apr. 17, 2015 (Apr. 17, 2015). 4 pages.
LG Electronics Inc., "Uu Based V2V: Latency Analysis", 3GPP TSG-RAN WG2 #x91 bis R2-154887, Oct. 9, 2015 (Oct. 9, 2015), section 2. 9 pages.
NTT Docomo., "Further Operational Aspecs on PC5-based and Uu-based V2X", 3GPP TSG RAN WG1 Meeting #82bis R1-155877, Oct. 9, 2015 (Oct. 9, 2015), p. 3, and figure 1. 6 pages.

* cited by examiner

METHOD AND APPARATUS FOR FORWARDING VEHICLE TO EVERYTHING SERVICE

CROSS-REFERENCE TO RELATED APPLICATION

This application is the 371 application of PCT Application No. PCT/CN2016/088442, filed Jul. 4, 2016, which is based upon and claims priority to Chinese Patent Application No. 201510736321.2, filed Nov. 2, 2015, the entire contents of which are incorporated herein by reference.

TECHNICAL FIELD

The present disclosure relates to, but is not limited to the field of communications, and in particular, to a method and apparatus for forwarding a Vehicle to Everything (V2X) service.

BACKGROUND

Vehicle to Everything (V2X) refers to providing vehicle information via sensors, on board terminals, and electronic tags mounted on the vehicle, implementing interconnection and intercommunication of Vehicle to Vehicle (V2V), Vehicle to Pedestrian (V2P), and Vehicle to Infrastructure (V2I) using various communication technologies, extracting and sharing information on an information network platform for effective use, and effectively controlling the vehicles, and providing comprehensive services. FIG. 1 is a schematic diagram of sending traffic and scheduling information to a vehicle through a network information platform in the related art.

A Road Side Unit (RSU) may receive a vehicle request, ensure that the vehicle accesses to the Internet, and has a gateway function; in addition, it also has data computation, storage, and forwarding functions.

There are two V2X implementing technologies currently: Dedicated Short Range Communication (DSRC) and Long Term Evolution (LTE). The DSRC is based on IEEE 802.11P and IEEE 1609 series standards, the IEEE 802.11P is responsible for a physical layer and Medium Access Control (MAC) technology, and the IEEE 1609 is responsible for upper layer specifications. The LTE-based V2X technologies have just been at the beginning of discussion, and have no standards yet.

The LTE V2X technologies currently being discussed by 3GPP include: the RSU may be implemented by a stationary UE or an eNB, the V2V/V2I/V2P may be implemented through a PC5 interface or a Uu interface. The PC5 interface refers to an air interface from a device to a device D2D, and the Uu interface refers to an air interface from the UE to the eNB.

In order to effectively use mobile network resources, the 3rd Generation Partnership Project (3GPP) proposes a Multimedia Broadcast Multicast Service (MBMS), which is a technology for moving data from one data source to multiple target mobile terminals, implements the sharing of network (including a core network and an access network) resources, and improves the utilization of the network resources (especially air interface resources). The 3GPP proposes a research topic of single-cell MBMS in LTE-A of R13, in which the single-cell MBMS service is transmitted on a Physical Downlink Shared Channel (PDSCH).

In the event of natural disasters or other emergencies, a Public Warning System (PWS) enables the public to receive accurate alerts in time. Together with an Earthquake and Tsunami Warning System (ETWS) introduced by R8, R9 introduces a Commercial Mobile Alert Service (CMAS), so that the warning system can still inform the residents in time by SMSs in the event of TV, broadcast signals, and power interruption after the disaster. After paging a message indication, it is sent by a System Information (SI).

However, no effective solutions are currently available for the problem that both the OBU and the eNB in the related art are difficult to forward V2X services through the Uu interface.

This section provides background information related to the present disclosure which is not necessarily prior art.

SUMMARY

The following is an overview of the subject detailed herein. This summary is not intended to limit the scope of protection of the claims.

The embodiments of the present disclosure provide a method and apparatus for forwarding a V2X service, which can implement to forward the V2X service by an OBU and an eNB through a Uu interface.

According to an aspect of the embodiments of the present disclosure, there is provided a method for forwarding a V2X service, including: receiving, by a base station eNB, information carrying a V2X service identification or an index of a V2X service identification sent by an On Board Unit (OBU) through a Uu interface; determining a V2X service needing to be forwarded according to the V2X service identification or the index of the V2X service identification, and determining a forwarding mode for forwarding the V2X service, by the eNB; and forwarding, by the eNB, data of the V2X service sent by the OBU through the Uu interface according to the forwarding mode.

Alternatively, the OBU sends the data of the V2X service to the eNB through a bearer, a bearer type is determined by an access layer of the OBU according to bearer indication information in an upper layer, and a data format of the V2X service is set.

Alternatively, the bearer type of the V2X service includes one of the followings: an IP bearer and a non-IP bearer.

Alternatively, before the base station eNB receives the information carrying the V2X service identification or the index of the V2X service identification sent by the On Board Unit (OBU), the method further includes: performing measurement configuration, by the eNB, on V2X communication of a PC5 interface; if the measurement configuration indicates that a signal quality of the PC5 drops below a preset measuring threshold, selecting, by the eNB, the Uu interface to forward the V2X service; or, receiving, by the eNB, a request for forwarding the V2X service through the Uu interface reported by the OBU; and responding, by the eNB, to the request to select the Uu interface to forward the V2X service.

Alternatively, before the eNB receives the information carrying the V2X service identification or the index of the V2X service identification sent by the On Board Unit (OBU), the method further includes: acquiring, by the eNB, at least one of a load of the PC5 interface and a coverage area of the V2X service; if the load of the PC5 interface exceeds a preset threshold value, or the PC5 interface cannot support the coverage area of the V2X service, or the load of the PC5 interface exceeds a preset threshold value and the PC5 interface cannot support the coverage area of the V2X service, selecting, by the eNB, the Uu interface to forward the V2X service.

Alternatively, the determining, by the eNB, the forwarding mode for forwarding the V2X service according to the V2X service identification or the index of the V2X service identification includes: searching, by the eNB, a V2X service needing to be forwarded through the Uu interface from the received V2X service according to the V2X service identification or the index of the V2X service identification; and determining, by the eNB, the forwarding mode for the V2X service needing to be forwarded through the Uu interface.

Alternatively, the forwarding mode includes at least one of the followings: a Single-Cell Point To Multipoint (SC-PTM), a System Information Broadcasting (SIB), a paging message, a Multicast Broadcast Single Frequency Network (MBSFN), a Public Warning System (PWS) and a unicasting.

According to another aspect of the embodiments of the present disclosure, there is provided a method for forwarding a V2X service, including: sending, by an On Board Unit (OBU), information carrying a V2X service identification or an index of a V2X service identification to an eNB through a Uu interface; determining, by the OBU, a bearer type of the V2X service and a data format of the V2X service according to bearer indication information in an upper layer of the OBU; and sending, by the OBU, the V2X service in the data format to the eNB according to the bearer type.

Alternatively, the bearer type of the V2X service includes one of the followings: an IP bearer and a non-IP bearer.

According to another aspect of the embodiments of the present disclosure, there is provided an apparatus for forwarding a Vehicle to Everything (V2X) service, applied to a base station eNB side, including: a first receiving module configured to receive information carrying a V2X service identification or an index of a V2X service identification sent by an On Board Unit (OBU) through a Uu interface; a first determining module configured to determine a V2X service needing to be forwarded according to the V2X service identification or the index of the V2X service identification, and determine a forwarding mode for forwarding the V2X service; and a forwarding module configured to forward data of the V2X service reported by the OBU through the Uu interface according to the forwarding mode.

Alternatively, the OBU reports the data of the V2X service to the eNB through a bearer, a bearer type is determined by an access layer of the OBU according to bearer indication information in an upper layer, and a data format of the V2X service is set.

Alternatively, the bearer type of the V2X service includes one of the followings: an IP bearer and a non-IP bearer.

Alternatively, the apparatus further includes: a measuring module configured to, before the base station eNB receives the information carrying the V2X service identification or the index of the V2X service identification sent by the On Board Unit (OBU), perform measurement configuration on V2X communication of a PC5 interface; a first selection module configured to, if the measurement configuration indicates that a signal quality of the PC5 drops below a preset measuring threshold, select the Uu interface to forward the V2X service; or, a second receiving module configured to, before the base station eNB receives the information carrying the V2X service identification or the index of the V2X service identification sent by the On Board Unit (OBU), receive a request for forwarding the V2X service through the Uu interface reported by the OBU; and a second selection module configured to respond to the request to select the Uu interface to forward the V2X service.

Alternatively, the apparatus further includes: an acquisition module configured to, before the base station eNB receives the information carrying the V2X service identification or the index of the V2X service identification sent by the On Board Unit (OBU), acquire at least one of a load of a PC5 interface and a coverage area of the V2X service; and a third selection module configured to, if the load of the PC5 interface exceeds a preset threshold value, or the PC5 interface cannot support the coverage area of the V2X service, or the load of the PC5 interface exceeds a preset threshold value and the PC5 interface cannot support the coverage area of the V2X service, select the Uu interface to forward the V2X service.

Alternatively, the first determining module includes: a searching unit configured to search a V2X service needing to be forwarded through the Uu interface from the received V2X service according to the V2X service identification or the index of the V2X service identification; and a determination unit configured to determine the forwarding mode for the V2X service needing to be forwarded through the Uu interface.

Alternatively, the forwarding mode includes at least one of the followings: a Single-Cell Point To Multipoint (SC-PTM), a System Information Broadcasting (SIB), a paging message, a Multicast Broadcast Single Frequency Network (MBSFN), a Public Warning System (PWS) and a unicasting.

According to still another aspect of the embodiments of the present disclosure, there is provided an apparatus for forwarding a V2X service, applied to an On Board Unit (OBU) side, including: a first sending module configured to send information carrying a V2X service identification or an index of a V2X service identification to a base station eNB through a Uu interface; a second determining module configured to determine a bearer type of the V2X service and a data format of the V2X service according to bearer indication information in an upper layer of the OBU; and a second sending module configured to send the V2X service in the data format to the eNB according to the bearer type.

Alternatively, the bearer type of the V2X service includes one of the followings: an IP bearer and a non-IP bearer.

In the embodiments of the present disclosure, the base station eNB receives the information carrying the V2X service identification or the index of the V2X service identification sent by the On Board Unit (OBU) through the Uu interface, then the eNB may determine the forwarding mode for forwarding the V2X service according to the V2X service identification or the index of the V2X service identification, and forward the V2X service through the Uu interface according to the forwarding mode after receiving the V2X service reported by the OBU, thereby implementing the manner in which the eNB forwards the V2X service through the Uu interface, and fills in the gap in the related art.

Other aspects will become apparent upon reading and understanding the drawings and detailed description.

This section provides a summary of various implementations or examples of the technology described in the disclosure, and is not a comprehensive disclosure of the full scope or all features of the disclosed technology.

DETAILED DESCRIPTION

The present disclosure will be explained in detail with reference to the accompanying drawings and embodiments hereinafter. It should be noted that, in case of no conflict, the embodiments and the features in the embodiments in the present application may be combined with each other.

It should be noted that the terms "first", "second" and the like in the description and claims of the present disclosure as well as the above drawings are used to distinguish similar objects, and are not necessarily used to describe a specific sequence or a chronological order.

Figure 1:
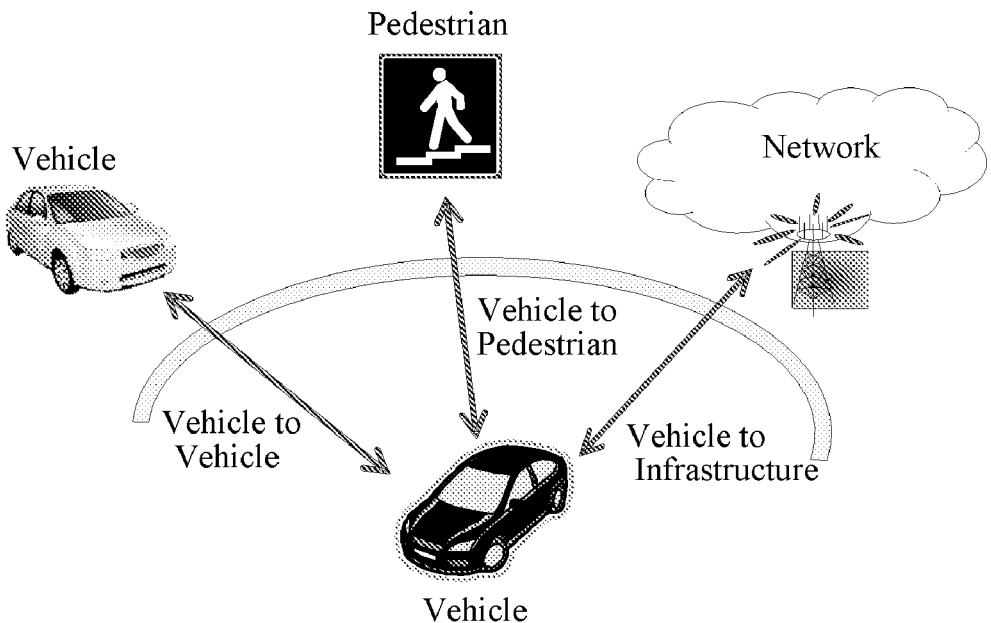
FIG. 1 is a schematic diagram of sending traffic and scheduling information to a vehicle through a network information platform in the related art.
Figure 2:
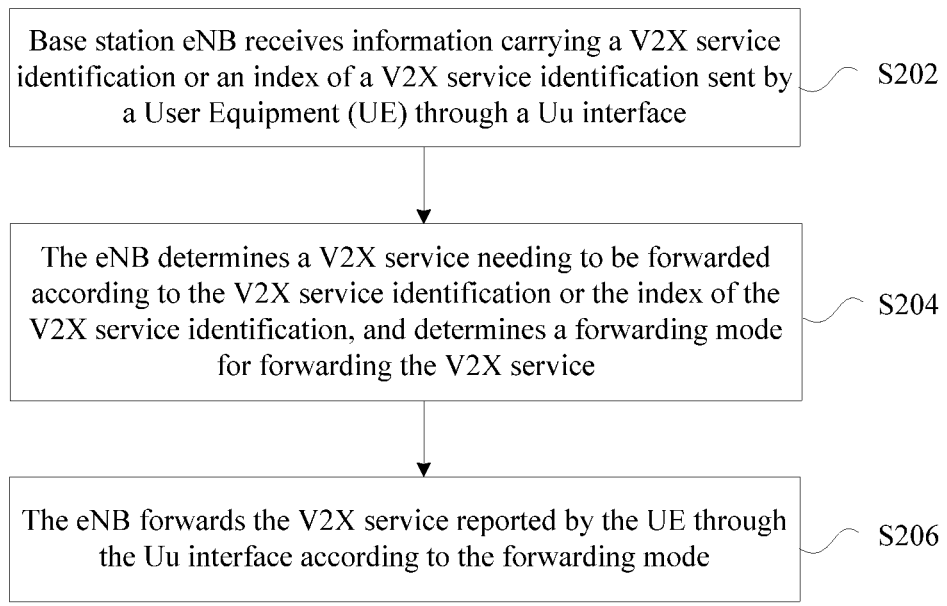
FIG. 2 is a first flow chart of a method for forwarding a V2X service according to an embodiment of the present disclosure.

In this embodiment, a method for forwarding a V2X service is provided. FIG. 2 is a first flow chart of a method for forwarding a V2X service according to an embodiment of the present disclosure. As shown in FIG. 2, the process includes the following steps.

In step 202, a base station eNB receives information carrying a V2X service identification or an index of a V2X service identification sent by an On Board Unit (OBU) through a Uu interface.

In step S204, the eNB determines a V2X service needing to be forwarded according to the V2X service identification or the index of the V2X service identification, and determines a forwarding mode for forwarding the V2X service.

In step S206, the eNB forwards the V2X service reported by the OBU through the Uu interface according to the forwarding mode.

Through steps S202 to S206, the base station eNB receives the information carrying the V2X service identification or the index of the V2X service identification sent by the On Board Unit (OBU) through the Uu interface, then the eNB may determine the forwarding mode for forwarding the V2X service according to the V2X service identification or the index of the V2X service identification, and forward the V2X service through the Uu interface according to the forwarding mode after receiving the V2X service reported by the OBU, thereby implementing the manner in which the eNB forwards the V2X service through the Uu interface, and fills in the gap in the related art.

It should be noted that in the optional implementation manner of the present embodiment, the OBU reports data of the V2X service to the eNB through a bearer, a bearer type is determined by an access layer of the OBU according to bearer indication information in an upper layer, and a data format of the V2X service is set. Moreover, the bearer type of the V2X service includes one of the followings: an IP bearer and a non-IP bearer.

In an optional implementation manner of the present embodiment, before the base station eNB receives the information carrying the V2X service identification or the index of the V2X service identification sent by the On Board Unit (OBU), the method of the present embodiment further includes the following steps.

In step S202-1, the eNB performs a measurement configuration on V2X communication of a PC5 interface.

In step S202-2, the eNB selects the Uu interface to forward the V2X service when the measurement configuration indicates that a signal quality of the PC5 drops below a preset measuring threshold; or, in step S202-3, the eNB receives a request for forwarding the V2X service through the Uu interface reported by the OBU.

In step S102-4, the eNB responds to the request to select the Uu interface to forward the V2X service.

Through the above steps S202-1 and S202-2, and steps S102-3 and S102-4, the measurement configuration of the V2X communication of the PC5 interface is set by the eNB. The measurement configuration includes: a measurement object, i.e., which PC5 interface is to be measured; optionally, the measurement configuration may also include: a measurement threshold, a measurement period, a measurement event, etc. The measurement threshold refers to reporting to the eNB when the OBU measurement satisfies the threshold, the measurement period is used for periodic measurement, and the measurement event is used for event-triggered measurement. The OBU measures a signal quality of the PC5 interface, such as data including a Reference Signal Received Power (RSRP), a Reference Signal Received Quality (RSRQ), a Reference Signal Strength Indicator (RSSI), and the like. When the measurement configuration is satisfied, for example, the signal quality drops to the measurement threshold, the OBU reports a measurement result to the eNB, and the eNB determines that the PC5 interface is not suitable for continuing to transmit the V2X service, then the eNB indicates the OBU (receiver and sender) to send the V2X service through the Uu interface, or the OBU requests to the eNB to forward the V2X service through the Uu interface, and the eNB receiving the request sends a confirmation message to the OBU.

In another optional implementation manner of the present embodiment, before the base station eNB receives the information carrying the V2X service identification or the index of the V2X service identification sent by the On Board Unit (OBU), the method according to the present embodiment may further include the following steps.

In step S202-5, the eNB acquires at least one of a load of the PC5 interface and a coverage area of the V2X service.

In step S202-6, the eNB selects the Uu interface to forward the V2X service when the load of the PC5 interface exceeds a preset threshold value and/or the PC5 interface cannot support the coverage area of the V2X service.

According to steps S202-5 and S202-6, the eNB refers to an eNB that performs V2X communication, and possible reasons for the eNB to determine that the ongoing V2X service of the PC5 interface needs to be transferred to the Uu interface are as follows: load balancing or coverage area expanding of the V2X service, wherein the load balancing refers to that the eNB determines that the PC5 interface is overloaded or congested and it is needed to transfer a part of the V2X service to the Uu interface, and the coverage area expanding of the V2X refers to that there is an occlusion near the OBU, and the PC5 transmission cannot guarantee that all neighboring OBUs receive the required V2X information. The eNB sends indication information to the OBU to convert the V2X service to the Uu interface.

In addition, for the manner of determining by the eNB, the forwarding manner for forwarding the V2X service according to the V2X service identification or the index of the V2X service identification mentioned in step S204 of the present embodiment, it is implemented in an optional implementation manner of the embodiment through the following steps.

In step S204-1, the eNB searches the V2X service needing to be forwarded through the Uu interface from the received V2X service according to the V2X service identification or the index of the V2X service identification.

In step S204-2, the eNB determines the forwarding mode for the V2X service needing to be forwarded through the Uu interface.

The forwarding mode includes at least one of the followings: a Single-Cell Point To Multipoint (SC-PTM), a System Information Broadcasting (SIB), a paging message, a Multicast Broadcast Single Frequency Network (MBSFN), a Public Warning System (PWS) and a unicasting.

As can be seen from the above steps S204-1 and S204-2, the OBU sends indication information to the eNB through the Uu interface. The indication information includes: the V2X service identification or the index of the V2X service identification. The indication information is transmitted through a L1/2 layer signaling or RRC signaling.

Figure 3:
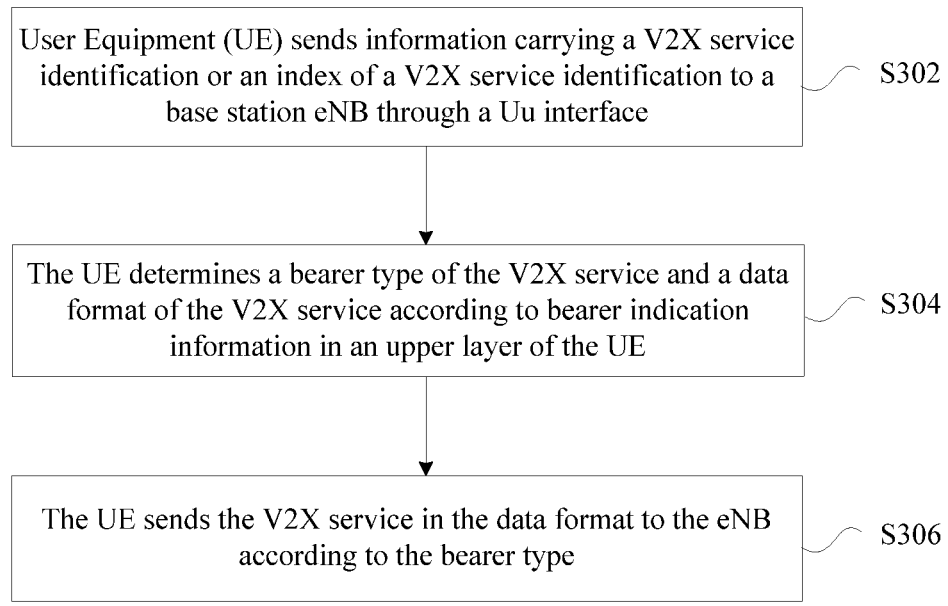
FIG. 3 is a second flow chart of a method for forwarding a V2X service according to an embodiment of the present disclosure.

FIG. 3 is a second flow chart of a method for forwarding a V2X service according to an embodiment of the present disclosure. As shown in FIG. 3, the method includes the steps.

In step S302, an On Board Unit (OBU) sends information carrying a V2X service identification or an index of a V2X service identification to a base station eNB through a Uu interface.

In step S304, the OBU determines a bearer type of the V2X service and a data format of the V2X service according to bearer indication information in an upper layer of the OBU.

In step S306, the OBU sends the V2X service in the data format to the eNB according to the bearer type.

It can be known from the above steps S302 to S306 that the data of the V2X service includes the V2X service identification or the index of the V2X service identification, for example, the V2X service identification or index may be indicated by a PDCP header of the data of the V2X service. Considering that the OBU may send the V2X service through the IP bearer of the Uu interface or the V2X private (non-IP) bearer, the upper layer of the OBU indicates to the access layer a transmission bearer type used by the Uu interface, and the access layer indicates the bearer type in the PDCP according to the received indication; accordingly, the PDCP/RLC/MAC/PHY layer sets the data format of the V2X according to the bearer type and selects a corresponding bottom bearer to send the V2X service. Moreover, the bearer type of the V2X service includes one of the followings: an IP bearer and a non-IP bearer.

Through the description of the above embodiments, those skilled in the art can clearly understand that the method according to the above embodiments may be implemented by means of software plus a necessary general hardware platform, and the method may also be implemented by means of hardware, but in many cases, the former is a better implementation manner. Based on such understanding, the essence or the part contributing to the related art of the technical solutions of the embodiments of the present disclosure may be embodied in the form of a software product, and the computer software product is stored in a storage medium (such as a ROM/RAM, a magnetic disk and an optical disk) including several instructions such that a terminal device (which may be a mobile phone, a computer, a server, or a network device, etc.) performs the method described in each of the embodiments of the present disclosure.

There is also provided an apparatus for forwarding a V2X service in the present embodiment. The apparatus is adapted to implement the foregoing embodiments and the optional implementation manners, but those which have been described will not be described repeatedly. As used below, the term "module" may implement a combination of software and/or hardware with a predetermined function. Although the apparatus described in the following embodiment is implemented by means of software, the implementation of hardware or a combination of software and hardware is also possible and conceived.

Figure 4:
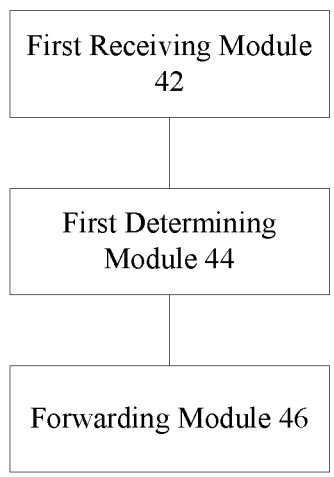
FIG. 4 is a first structure diagram of an apparatus for forwarding a V2X service according to an embodiment of the present disclosure.

FIG. 4 is a first structure diagram of an apparatus for forwarding a Vehicle to Everything (V2X) service according to an embodiment of the present disclosure, which is applied to a base station eNB side. As shown in FIG. 4, the apparatus includes: a first receiving module 42 configured to receive information carrying a V2X service identification or an index of a V2X service identification sent by an On Board Unit (OBU) through a Uu interface; a first determining module 44 coupled to the first receiving module 42 and configured to determine a V2X service needing to be forwarded according to the V2X service identification or the V2X service identification index, and determine a forwarding mode for forwarding the V2X service; and a forwarding module 46 coupled to the first determining module 44 and configured to forward the V2X service reported by the OBU through the Uu interface according to the forwarding mode.

Optionally, the OBU reports data of the V2X service to the eNB through a bearer, a bearer type is determined by an access layer of the OBU according to bearer indication information in an upper layer, and a data format of the V2X service is set. Moreover, the bearer type of the V2X service includes one of the followings: an IP bearer and a non-IP bearer.

Optionally, before the base station eNB receives the information carrying the V2X service identification or the V2X service identification index sent by the On Board Unit (OBU), the apparatus further includes: a measuring module coupled to the first selection module and configured to perform a measurement configuration on V2X communication of a PC5 interface; a first selection module coupled to the first receiving module 42 and configured to select the Uu interface to forward the V2X service when the measurement configuration indicates that a signal quality of the PC5 drops below a preset measuring threshold; or, a second receiving module coupled to the second selecting module and configured to receive a request for forwarding the V2X service through the Uu interface reported by the OBU; and a second selection module coupled to the first receiving module 42 and configured to respond to the request to select the Uu interface to forward the V2X service.

Optionally, before the base station eNB receives the information carrying the V2X service identification or the V2X service identification index sent by the On Board Unit (OBU), the apparatus further includes: an acquisition module coupled to the third selection module and configured to acquire at least one of a load of the PC5 interface and a coverage area of the V2X service; and a third selection module configured to select the Uu interface to forward the V2X service when the load of the PC5 interface exceeds a preset threshold value and/or the PC5 interface cannot support the coverage area of the V2X service.

Optionally, the first determining module 44 includes: a searching unit configured to search the V2X service needing to be forwarded through the Uu interface from the received V2X service according to the V2X service identification or the V2X service identification index; and a determination unit coupled to the searching unit and configured to determine the forwarding mode for the V2X service needing to be forwarded through the Uu interface. The forwarding mode includes at least one of the followings: a Single-Cell Point To Multipoint (SC-PTM), a System Information Broadcasting (SIB), a paging message, a Multicast Broadcast Single Frequency Network (MBSFN), a Public Warning System (PWS) and a unicasting.

Figure 5:
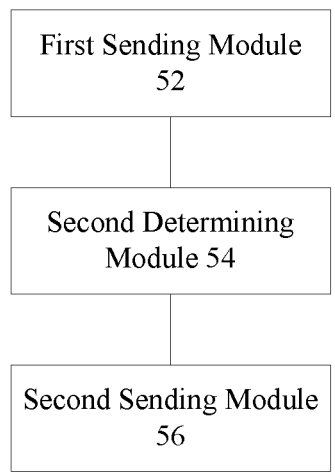
FIG. 5 is a second structure diagram of an apparatus for forwarding a V2X service according to an embodiment of the present disclosure.

FIG. 5 is a second structure diagram of an apparatus for forwarding a V2X service applied to an On Board Unit (OBU) side according to an embodiment of the present disclosure. As shown in FIG. 5, the apparatus includes: a first sending module 52 configured to send information carrying a V2X service identification or a V2X service identification index to a base station eNB through a Uu interface; a second determining module 54 coupled to the first sending module 52 and configured to determine a bearer type of the V2X service and a data format of the V2X service according to bearer indication information in an upper layer of the OBU; and a second sending module 56 coupled to the second determining module 54 and configured to send the V2X service in the data format to the eNB according to the bearer type.

Optionally, the bearer type of the V2X service includes one of the followings: an IP bearer and a non-IP bearer.

It should be noted that each of the above modules may be implemented by software or hardware. For the latter, it may be implemented by the following manners, but is not limited thereto: the above modules are all disposed in the same processor; or, the above modules are respectively disposed in multiple processors.

The present disclosure will be illustrated in detail hereinafter with reference to an optional embodiment of the present disclosure.

The optional embodiment provides a method for a base station to forward a V2X service. The method includes: sending, by an On Board Unit (OBU), information carrying a V2X service identification or a V2X service identification index to a base station through a Uu interface; determining, by the base station, to adopt local forwarding according to the received information, forwarding, by the base station, the V2X service, and detecting and receiving, by the interested OBU, the required V2X service.

The present disclosure will be described hereinafter with reference to different application scenarios of the optional embodiment.

Figure 6:
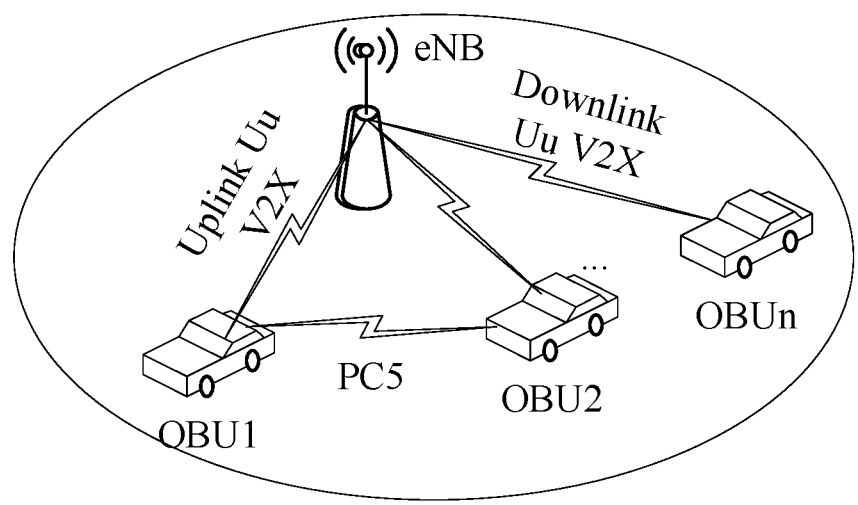
FIG. 6 is a schematic diagram of locally forwarding a V2X service within a coverage of a base station according to an optional embodiment of the present disclosure.

First Scenario:

FIG. 6 is a schematic diagram of locally forwarding a V2X service within base station coverage according to an optional embodiment of the present disclosure. As shown in FIG. 6, when PC5→Uu, the method includes the following steps.

In step S602, the OBU performs V2X communication through the Uu interface, wherein the V2X includes: V2V, V2I, and V2P. There are two possible use cases in this scenario:

an object measured in the first scenario is the PC5 interface. The eNB performs a measurement configuration of the PC5 interface and notifies the OBU. The OBU measures the PC5 interface and reports according to the measurement configuration. A measurement signal to the PC5 interface may include at least one of the followings: a RSRP, a RSRQ, and a RSSI.

The OBU detects that a quality of the PC5 drops to a predefined threshold and then reports a measurement result to the eNB. The eNB determines to continue the V2X communication using the Uu interface, and the eNB indicates the OBU to forward the V2X service through the Uu interface.

If the sender OBU communicated via the PC5 is in a Radio Resource Control (RRC)-Idle state, the OBU establishes an RRC connection to enter a Radio Resource Control (RRC)-Connected state firstly, and then sends a measurement report or performs the V2X service; and if the sender OBU is already in the RRC-Connected state, then the V2X service is directly sent to the eNB.

In the optional embodiment, the eNB may select the Uu interface to forward the V2X service in the following two manners.

First Manner: Based on Measurement or a OBU Request

The eNB sets a measurement configuration of the V2X communication of the PC5 interface. The measurement configuration includes: a measurement object, i.e., which PC5 interface is to be measured; optionally, the measurement configuration may further include: a measurement threshold, a measurement period, a measurement event, etc. The measurement threshold refers to reporting to the eNB when the OBU measurement satisfies the threshold. The measurement period is used for periodic measurement. The measurement event is used for event-triggered measurement. The OBU measures a signal quality of the PC5 interface, such as data including Reference Signal Received Power (RSRP), Reference Signal Received Quality (RSRQ), Reference Signal Strength Indicator (RSSI), and the like. When the measurement configuration is satisfied, for example, the signal quality drops to the measurement threshold, the OBU reports a measurement result to the eNB, and the eNB determines that the PC5 interface is not suitable for continuing to transmit the V2X service, then the eNB indicates the OBU (receiver and sender) to send the V2X service through the Uu interface, or the OBU requests to the eNB to forward the V2X service through the Uu interface, and the eNB receiving the request sends a confirmation message to the OBU.

Second Manner: Initiated by the eNB

The eNB refers to an eNB that performs V2X communication. The eNB determines that the ongoing V2X service of the PC5 interface needs to be converted to the Uu interface, the possible causes are as follows: load balancing or coverage area expanding of the V2X service. The load balancing refers to that the eNB determines that the PC5 interface is overloaded or congested and needs to transfer a part of the V2X service to the Uu interface. The coverage area expanding of the V2X service refers to that there is an occlusion near the OBU, and the PC5 transmission cannot guarantee that all neighboring OBUs receive the required V2X information. The eNB sends indication information to the OBU: to convert the V2X service to the Uu interface.

The eNB sends the indication information of converting to the Uu interface to the OBU through a RRC signaling.

In step S604, the OBU sends V2X indication information to the eNB.

The OBU sends the indication information to the eNB through the Uu interface. The indication information includes: the V2X service identification or the V2X service identification index. The indication information is transmitted through a L1/2 layer signaling or a RRC signaling.

In step S606, the OBU sends the V2X service data through the Uu interface.

The V2X service data includes the V2X service identification or the V2X service identification index. For example, the V2X service identification or index may be indicated by a PDCP header of the V2X service data. Considering that the OBU may send the V2X service through the IP bearer or the V2X private (non-IP) bearer of the Uu interface, the upper layer of the OBU indicates to the access layer the transmission type of the bearer used by the Uu interface, and the access layer indicates the bearer type in the PDCP according to the received indication. Accordingly, the PDCP/RLC/MAC/PHY layer sets the data format of the V2X service according to the bearer type and selects a corresponding bottom bearer to send the V2X service.

In step S608, the eNB determines a mode for forwarding the V2X service.

The eNB receives the V2X service data sent by the OBU, selects a sending mode according to the V2X service identification or the V2X service identification index and a local policy. Optionally, the forwarding mode includes at least one of the followings: a Single-Cell Point To Multipoint (SC-PTM), a System Information Broadcasting (SIB), a paging message, a MBSFN, a PWS and a unicasting.

In step S610, the eNB forwards the V2X service data.

In step S612, the target OBU detects and receives the required V2X service.

Figure 7:
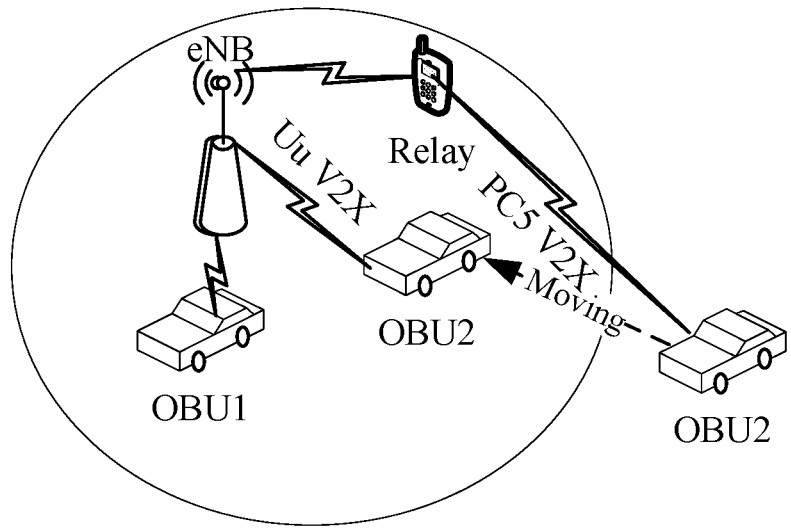
FIG. 7 is a schematic diagram of an OBU moving from an outside of a coverage of a LTE base station into the coverage of the LTE base station to forward a V2X through a Uu interface according to an optional embodiment of the present disclosure.

Second Scenario:

FIG. 7 is a schematic diagram of an OBU moving from outside of LTE base station coverage into the LTE base station coverage to forward V2X through a Uu interface according to an optional embodiment of the present disclosure. It should be noted that the second scenario is basically similar to the first scenario, and the manner in step S604 in the first scenario is processed. Therefore, how to implement step S604 is mainly explained in the second scenario. As shown in FIG. 7, the method includes the following steps.

In step S604-1, when PC5→Uu, the OBU from Outside Of coverage (OOC) into the coverage IC, i.e., OOC→IC. The OBU (outside the coverage) performs V2X communication through the PC5, then the OBU enters the LTE coverage, and the OBU sends a measurement result to the eNB. The eNB determines to communicate through the Uu interface, and sends the indication information to the OBU through a RRC signaling, and then the OBU establishes a connection with the eNB and the V2X communication is continued through the Uu interface.

At this moment, both the OBUs of the two communicating parties are in the LTE coverage.

In step S604-2, when a reply→Uu, the OBU moves from outside of coverage into the coverage, i.e., OOC→IC. The OBU (outside the coverage) performs V2X communication through the relay, then the OBU enters the LTE coverage, and the OBU sends a measurement result to the eNB. The eNB determines to communicate through the Uu interface, and sends the indication information to the OBU through a RRC signaling, and then the OBU establishes a connection with the eNB and the V2X communication is continued through the Uu interface.

After the OBU establishes the RRC connection with the eNB, the following steps are the same as those of the first scenario.

To ensure the reliability of the V2X service, the OBU may continue to broadcast and send the V2X service data on the PC5 while sending the V2X service data to the eNB. The target OBU may receive the V2X service needed from the Uu or PC5.

It should be noted that in the optional embodiment, the On Board Unit (OBU) is equivalent to a User Equipment (UE) or an on board mobile terminal.

The base station sends the indication information through a system broadcast message or a dedicated RRC message. The system broadcast message may be a relevant SIB message added with a corresponding field or a SIB message newly added for V2X.

The information reported by the OBU to the base station includes at least one of the followings: a V2X service identification being received or interested in receiving, an OBU capability, and a measurement report. The OBU capability includes at least one of the followings: a Carrier Aggregation (CA) capability, a MBMS capability, a DSRC capability, a Dual Connectivity (DC) capability, and a LTE and DSRC simultaneous reception capability. The reporting of the OBU is achieved through a RRC signaling or a L1/2 layer signaling. The reporting condition is any of the followings: the OBU reports periodically, the reporting is triggered by an event, the OBU initiatively reports, or the eNB requests the OBU to report.

The present disclosure will be described in detail hereinafter with reference to the drawings and specific embodiments.

First Embodiment

Figure 8:
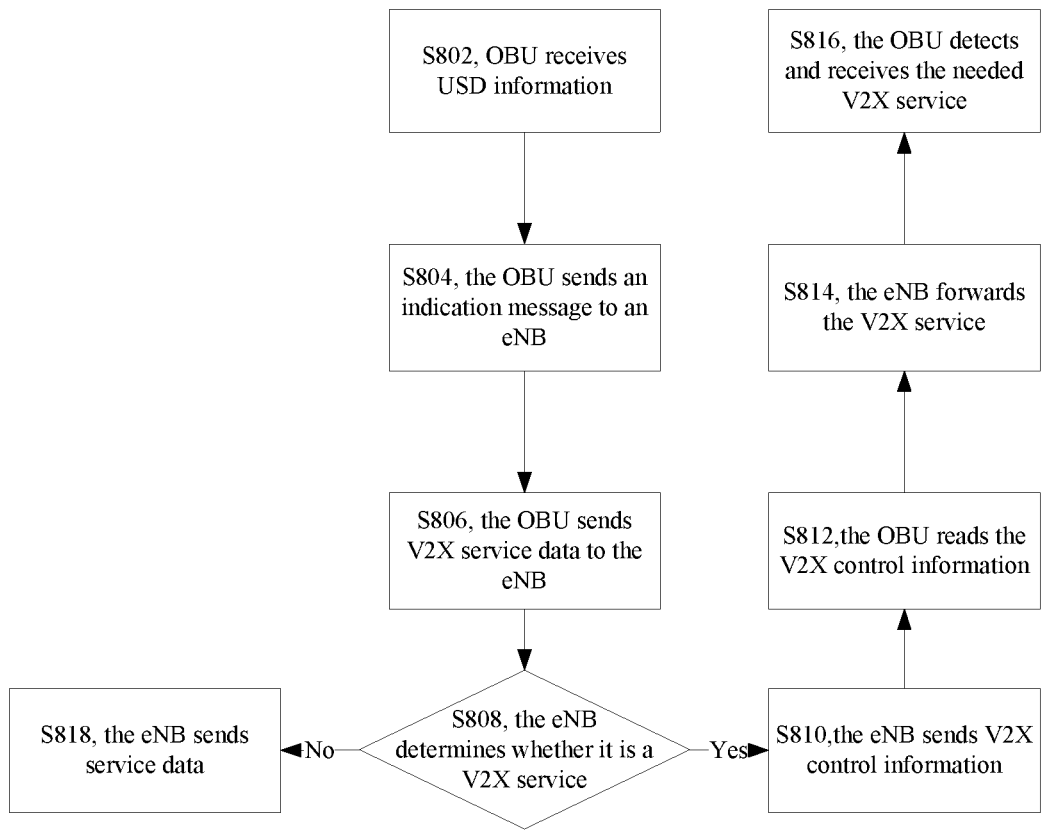
FIG. 8 is a flow chart of a method for forwarding a V2X service by an eNB using a SC-PTM according to an optional embodiment of the present disclosure.

FIG. 8 is a flow chart of a method for forwarding a V2X service by an eNB using a SC-PTM according to an optional embodiment of the present disclosure. As shown in FIG. 8, the method includes the following steps.

In step S802, an OBU receives User Service Description (USD) information.

The OBU receives the USD information sent by a server through an application layer. The USD information at least includes: a V2X service identification. The V2X service identification is indicated by using a TMGI.

In step S804, the OBU sends an indication message to the eNB.

The indication message includes: a V2X service identification or a V2X service identification index.

The OBU sends the V2X service identification through a RRC signaling or a L1/2 layer signaling, for example, the OBU sends the V2X service identification through a random access process or an RRC connection establishment process. The V2X service identification is a TMGI or an index corresponding to the TMGI, for example, the OBU has three V2X services: TMGI1, TMGI2, and TMGI3, and corresponding indexes are 1, 2, and 3. The index may be sent by the OBU to the eNB, or an index value is established and sent to the OBU after the eNB receives the V2X service identification.

In step S806, the OBU sends V2X service data to the eNB.

The OBU sends the V2X service through a Uu interface. The V2X service data includes the V2X service identification or the service index, for example, the V2X service index or service identification is included in a PDCP header.

The OBU sends the V2X service data through an IP bearer or a V2X special (non-IP) bearer.

In step S808, the eNB determines whether it is a V2X service. If it is the V2X service, the process goes to step S810; and if it is not the V2X service, the process goes to step S818.

The eNB receives the V2X service sent by the OBU, and determines that the service is the V2X service according to the V2X service identification or index in the V2X service data. If no V2X service identification or V2X service identification index is found, it indicates that it is not the V2X service, such as, a common unicast service.

In step S810, the eNB sends V2X control information, and the control information includes: SIB, MCCH, and a subframe mode.

The eNB sends SC-PTM related SIB, MCCH and scheduling information. The SIB is used to indicate resource configurations of the MCCH, the MCCH is used to indicate resource configurations of the MTCH corresponding to the V2X service (mapping of the TMGI and the RNTI, a sending mode, etc.), and the subframe mode is used to indicate location information of a sending subframe of the V2X service.

In step S812, the OBU reads the V2X control information.

The OBU includes all OBUs that are interested in receiving the V2X service in a cell covered by the eNB. The OBU reads the V2X related SIB, MCCH, and subframe mode information.

In step S814, the eNB forwards the V2X service.

The eNB broadcasts and forwards the V2X service on a PDSCH, and sends scheduling information of the V2X service on the PDCCH. The V2X service is identified by a corresponding RNTI. The scheduling information is used to indicate the resource configurations of the MTCH (time-frequency location, MCS, etc.).

In step S816, the OBU detects and receives the needed V2X service.

The OBU determines that there is an interested V2X service according to the MCCH. The OBU detects the needed RNTI in the corresponding subframe. If the needed RNTI is detected, the OBU further receives the needed V2X service according to the scheduling information on the PDCCH.

In step S818, the eNB performs processing according to a unicast or multicast service flow.

The data received by the eNB is not a V2X service, for example, a unicast or multicast service sent by an ordinary UE. The eNB processes such services by using related processes.

Second Embodiment

Figure 9:
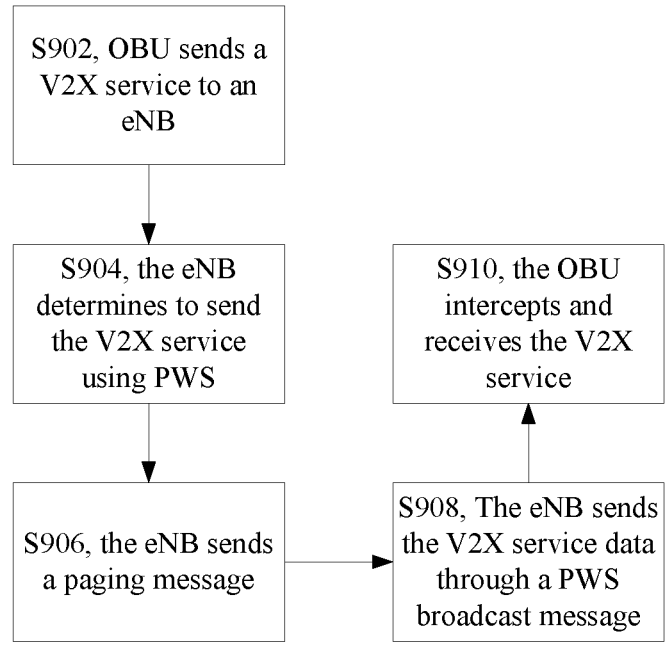
FIG. 9 is a flow chart of a method for forwarding a V2X service by an eNB using a PWS according to an optional embodiment of the present disclosure.

FIG. 9 is a flow chart of a method for forwarding a V2X service by an eNB using a PWS according to an optional embodiment of the present disclosure. As shown in FIG. 9, the method includes the following steps.

In step S902, an OBU sends a V2X service to an eNB.

The V2X service includes V2X service indication information, i.e., the eNB may determine that the received data is V2X service data through the indication information.

In step S904, the eNB determines to send the V2X service using PWS.

The eNB sends the V2X service by using PWS according to attributes of the V2X service, such as a size, a delay requirement, and a priority. The PWS refers to a system broadcast message sent through SIB10-12.

In step S906, the eNB sends a paging message.

The eNB sends a paging message and indicates an update generated in the SIB 10-12 in the paging message.

In step S908, the eNB sends the V2X service data through the PWS broadcast message.

The eNB selects the SIB10-12 to send the V2X service data. To be specific, the V2X service data may be sent through SIB10 or SIB11+SIB12. If the V2X service data is relatively small, then the data is sent through SIB10, while other V2X service data is sent through SIB11+SIB12. The relatively small V2X service data refers to the V2X service data less than 1000 bytes, or the V2X service data that may be borne by SIB10.

In step S910, the OBU intercepts and receives the V2X service.

The eNB intercepts the paging message firstly, and receives the needed V2X service according to the paging message.

Third Embodiment

It should be noted that, in the optional embodiment, the base station forwards the V2V service through a MBSFN, which is similar to the process of the first embodiment, but differs in that: 1) the eNB sends the V2X service using a MBSFN subframe; 2) the eNB configures MCH scheduling information MSI to indicate the scheduling of the V2X service; and 3) the OBU detects and receives the needed V2X service on the MBSFN subframe.

Fourth Embodiment

Figure 10:
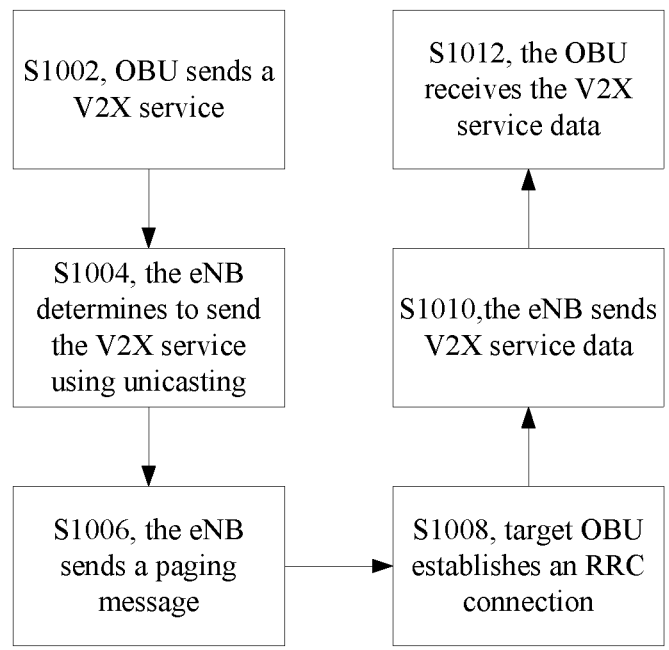
FIG. 10 is a flow chart of a method for forwarding a V2X service by a base station using a unicast bearer according to an optional embodiment of the present disclosure.

FIG. 10 is a flow chart of a method for forwarding a V2X service by a base station using a unicast bearer according to an optional embodiment of the present disclosure. As shown in FIG. 10, the method includes the following steps.

In step S1002, an OBU sends a V2X service to an eNB.

The V2X service includes V2X service indication information, i.e., the eNB may determine that the received data is V2X service data through the indication information.

In step S1004, the eNB determines to forward the V2X service using unicasting.

The eNB determines to send the V2X service using a unicast bearer according to attributes of the V2X service, such as a number of target OBUs, a delay requirement, and a priority.

In step S1006, the eNB sends a paging message.

The base station eNB sends a paging message and indicates the target OBU in the paging message.

In step S1008, the target OBU establishes an RRC connection with the eNB.

The target OBU intercepts the paging message firstly, and establishes the RRC connection with the eNB according to the paging message.

It should be noted that steps S1006 and S1008 are used when the target OBU is in a RRC-Idle state, and if the target OBU is in a RRC-Connected state, steps S1006 and S1008 are unnecessary.

In step S1010, the eNB sends V2X service data to the target OBU.

The eNB sends the V2X service data to the target OBU through a PDSCH.

In step S1012, the OBU receives the V2X service data.

Fifth Embodiment

In the optional embodiment, the base station forwards the V2V service through paging. The optional embodiment is similar to the second embodiment, but differs in that: 1) the eNB determines to send the V2X service using a paging message; 2) the eNB places the V2X service data in the paging message; and 3) the target OBU intercepts the paging messages at a Paging Occasion (PO) and acquires the needed V2X service data.

Figure 11:
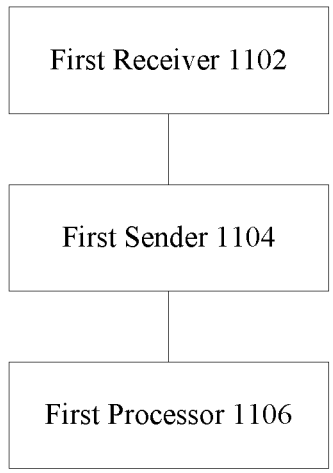
FIG. 11 is a first structure diagram of an apparatus for forwarding a V2X service by a base station according to an optional embodiment of the present disclosure.

FIG. 11 is a first structure diagram of an apparatus for forwarding a V2X service by a base station according to the optional embodiment. As shown in FIG. 11, the apparatus includes: a first receiver 1102 configured to receive indication information and V2X service data sent by an OBU; a first sender 1104 configured to send the V2X service data and V2X service related control information to the OBU; and a first processor 1106 configured to determine a V2X sending mode.

The above apparatus is a LTE RSU, or a DSRC RSU, or a LTE base station, wherein the LTE RSU includes: a base station eNB in an E-UTRAN or a static UE.

Figure 12:
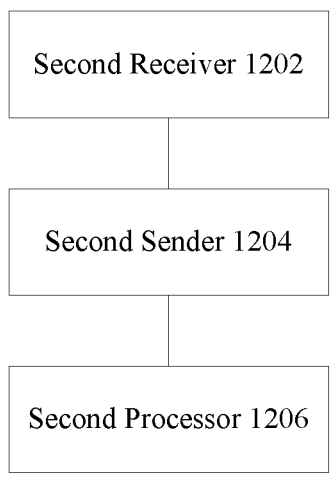
FIG. 12 is a second structure diagram of an apparatus for forwarding a V2X service according to an optional embodiment of the present disclosure.

FIG. 12 is a second structure diagram of an apparatus for forwarding a V2X service according to an optional embodiment of the present disclosure. As shown in FIG. 12, the apparatus includes: a second receiver 1202 configured to receive V2X control information and V2X service data sent by a base station; a second sender 1204 configured to send indication information and V2X service data to the base station; and a second processor 1206 configured to determine a V2X service receiving manner.

The above apparatus includes a LTE OBU, or a DSRC OBU, or a LTE user equipment UE, and the LTE RSU includes: the user equipment UE in the E-UTRAN or a mobile terminal.

The embodiments of the present disclosure also provide a storage medium. Optionally, the above storage medium in the embodiment may be configured to store program codes for executing the following steps:

In S1: a base station eNB receives information carrying a V2X service identification or a V2X service identification index sent by an On Board Unit (OBU) through a Uu interface.

In S2: the eNB determines a forwarding mode for forwarding the V2X service according to the V2X service identification or the V2X service identification index.

In S3: the eNB forwards the V2X service reported by the OBU through the Uu interface according to the forwarding mode.

Optionally, for a specific example in this embodiment, reference may be made to the examples described in the foregoing embodiments and optional embodiments, which will not be elaborated in this embodiment.

It will be apparent to those skilled in the art that the above-described modules or steps of the present disclosure may be implemented by a general purpose computing device which may be focused on a single computing device or distributed over a plurality of computing devices, which may optionally be implemented by a program code executable by the computing device, so that they may be stored in a storage device by the computing device and, in some cases, the steps shown or described may be performed in sequence different from here; or they are separately made into each integrated circuit module, or multiple modules or steps in them are made into a single integrated circuit module. Thus, the present disclosure is not limited to any particular combination of hardware and software.

Those described above are merely optional embodiments of the present disclosure, and are not intended to limit the present disclosure. For those skilled in the art, the present disclosure may have various changes and modifications. Any change, equivalent substitution, and improvement made within the spirit and principle of the present disclosure shall fall within the protection scope of the present disclosure.

INDUSTRIAL APPLICABILITY

The foregoing technical solutions implement the manner in which the eNB forwards the V2X service through the Uu interface, and fills the gap in the related art.

The invention claimed is:

1. A method for forwarding a Vehicle to Everything (V2X) service, wherein the V2X service is ongoing at a PC5 interface and is to be transferred to a Uu interface, and the method comprises:
   receiving, by a base station eNB, information carrying a V2X service identification or an index of a V2X service identification sent by a User Equipment (UE) through the Uu interface, wherein the UE sends the information to the base station eNB through a bearer;
   determining the V2X service needing to be forwarded according to the V2X service identification or the index of the V2X service identification, and determining a forwarding mode for forwarding the V2X service, by the base station eNB; and
forwarding, by the base station eNB, data of the V2X service sent by the UE through the Uu interface according to the forwarding mode;
   determining, by an access layer of the UE, a bearer type according to bearer indication information in an upper layer of the UE, wherein the bearer type of the V2X service is Internet Protocol (IP) bearer; and
   setting, by the access layer of the UE, a data format of the V2X service according to the bearer indication information in the upper layer of the UE.

2. The method according to claim 1, further comprising:
   before the base station eNB receives the information carrying the V2X service identification or the index of the V2X service identification sent by the User Equipment (UE), performing a measurement configuration, by the base station eNB, on V2X communication of the PC5 interface;
   if the measurement configuration indicates that a signal quality of the PC5 drops below a preset measuring threshold, selecting, by the base station eNB, the Uu interface to forward the V2X service;
   or,
   receiving, by the base station eNB, a request for forwarding the V2X service through the Uu interface reported by the UE; and
   responding, by the base station eNB, to the request to select the Uu interface to forward the V2X service.

3. The method according to claim 1, further comprising:
   before the base station eNB receives the information carrying the V2X service identification or the index of the V2X service identification sent by the User Equipment (UE), acquiring, by the base station eNB, at least one of a load of the PC5 interface and a coverage area of the V2X service; and if the load of the PC5 interface exceeds a preset threshold value, or the PC5 interface cannot support the coverage area of the V2X service, or the load of the PC5 interface exceeds a preset threshold value and the PC5 interface cannot support the coverage area of the V2X service, selecting, by the base station eNB, the Uu interface to forward the V2X service.

4. The method according to claim 1, wherein the determining, by the base station eNB, the forwarding mode for forwarding the V2X service according to the V2X service identification or the index of the V2X service identification comprises:

searching, by the base station eNB, a V2X service needing to be forwarded through the Uu interface from the received V2X service according to the V2X service identification or the index of the V2X service identification; and determining, by the base station eNB, the forwarding mode for the V2X service needing to be forwarded through the Uu interface.

5. The method according to claim 4, wherein the forwarding mode comprises at least one of following: a Single-Cell Point To Multipoint (SC-PTM), a System Information Broadcasting (SIB), a paging message, a Multicast Broadcast Single Frequency Network (MBSFN), a Public Warning System (PWS) and a unicasting.

6. A method for forwarding a Vehicle to Everything (V2X) service, wherein the V2X service is ongoing at a PC5 interface and is to be transferred to a Uu interface, and the method comprises:

sending, by a User Equipment (UE), information carrying a V2X service identification or an index of a V2X service identification to a base station eNB through the Uu interface;

determining, by the UE, a bearer type of the V2X service and a data format of the V2X service according to bearer indication information in an upper layer of the UE; and sending, by the UE, the V2X service in the data format to the base station eNB according to the bearer type, wherein the bearer type of the V2X service is Internet Protocol (IP) bearer.

7. An apparatus for forwarding, a Vehicle to Everything (V2X) service, applied to a User Equipment (UE), wherein the V2X service is ongoing at a PC5 interface and is to be transferred to a Uu interface, and the apparatus comprises:

a processor; and a memory for storing instructions executable by the processor;

wherein the processor is configured to:

send information carrying a V2X service identification or an index of a V2X service identification to a base station eNB through the Uu interface;

determine a bearer type of the V2X service and a data format of the V2X service according to bearer indication information in an upper layer of the UE; and send the V2X service in the data format to the base station eNB according to the bearer type, wherein the bearer type of the V2X service is Internet Protocol (IP) bearer.

* * * * *